United States Patent [19]

Jordan

[11] Patent Number: 4,490,432
[45] Date of Patent: Dec. 25, 1984

[54] REINFORCED PAVEMENT-MARKING SHEET MATERIAL

[75] Inventor: Stanley J. Jordan, Stillwater, Minn.

[73] Assignee: Minnesota Mining and Manufacturing Company, St. Paul, Minn.

[21] Appl. No.: 547,663

[22] Filed: Nov. 1, 1983

Related U.S. Application Data

[63] Continuation-in-part of Ser. No. 371,214, Apr. 23, 1982, abandoned.

[51] Int. Cl.$^3$ ............................................. B32B 5/16
[52] U.S. Cl. ................................. 428/220; 404/14; 428/323; 428/324; 428/331
[58] Field of Search ............. 428/337, 323, 324, 331, 428/220; 404/14; 264/1.6, 1.7

[56] References Cited

U.S. PATENT DOCUMENTS 4,069,281  1/1978  Eigenmann ................... 404/14 X
4,117,192  9/1978  Jorgensen ....................... 428/337

*Primary Examiner*—Thomas J. Herbert
*Attorney, Agent, or Firm*—D. M. Sell; J. A. Smith; R. R. Tamte

[57] ABSTRACT

Pavement-marking sheet material which comprises a non-crosslinked elastomeric precursor such as acrylonitrile-butadiene polymer; a thermoplastic polymer such as polyethylene which reinforces the sheet material, e.g., by orientation of the thermoplastic polymer so that the calendered product exhibits greater tensile strength downweb than crossweb; and a particulate inorganic filler, which preferably includes platelet-type fillers such as talc, mica, or magnesium silicate.

17 Claims, No Drawings

REINFORCED PAVEMENT-MARKING SHEET MATERIAL

This application is a continuation-in-part of application Ser. No. 371,214, filed Apr. 23, 1982 now abandoned.

BACKGROUND OF THE INVENTION

The present invention provides a new pavement-marking sheet material of the general type described in U.S. Pat. No. 4,117,192. Such sheet material comprises a polymeric material that could be crosslinked to form an elastomer, but which is not crosslinked in the sheet material and thereby provides desired viscoelastic properties. A blend of this material with other polymeric materials and inorganic fillers has been found to provide properties that give long-lasting pavement markings—good conformability to a roadway surface, abrasion resistance, tensile and tear strength, etc.

Despite its well established utility, the described sheet material is deficient for some uses because asbestos fibers constitute a large proportion of the inorganic fillers in the sheet material. Asbestos fibers contribute importantly to the desired properties of the sheet material, but for toxicity reasons, use of such fibers has been foreclosed under many circumstances.

The new sheet material eliminates asbestos fibers, and does it without sacrificing desired properties of the sheet material. To the contrary, sheet material of the invention offers superior properties—superior abrasion resistance, higher tensile strength and modulus, and improved whiteness; and also the composition may be processed into sheet form more readily.

Briefly, these advantages are obtained with a composition that comprises 100 parts of non-crosslinked elastomer precursor[1]: at least 5 parts of a thermoplastic reinforcing polymer which is dispersed in the elastomer as a separate phase (i.e., because of insolubility or immiscibility with the other polymeric ingredients) and softens at a temperature between about 75° C.; and 200° C.; and a particulate inorganic filler dispersed in the composition. This composition is processable on calendering rolls into a thin sheet material, generally between about ¼ and 3 millimeters in thickness.

[1] "Elastomer-precursor" is used herein to describe a polymer which can be crosslinked, vulcanized, or cured to form an elastomer. "Elastomer" is used to mean a material that can be stretched, to at least about twice its original dimensions without rupture and upon release of the stretching force rapidly returns to substantially its original dimensions.

The separate-phase nature of the reinforcing polymer is considered desirable, in that it is believed that the polymer becomes oriented during the calendering operation and reinforces the sheet material. Such a reinforcement is indicated by the fact that the tensile strength of the sheet material is significantly stronger in the downweb direction (i.e., in the direction of calendering) than in the crossweb, or transverse, direction.

Preferably the reinforcing polymer comprises polyolefin, especially polyethylene. An extender resin such as halogenated paraffin, which is soluble in the non-crosslinked elastomer precursor, is also preferably included in the composition. Also, platelet fillers, such as magnesium silicate, are preferred.

An earlier patent, U.S. Pat. No. 4,069,281, teaches a pavement-marking sheet material which includes low-molecular-weight polyethylene together with regenerated nitrile rubber and chlorobutadiene rubber (neoprene). However, when sheet material as described in this patent is made and calendered, no orientation or downweb reinforcement is detected. The sheet material is as strong in the crossweb direction as it is in the downweb direction. Apparently the low-molecular-weight polyethylene does not form an oriented reinforcement in the manner of the reinforcing polymer in sheet material of the invention. The prior art composition is low in tensile and tear strength, especially at elevated temperatures such as may be experienced in summer-time application of pavement markings; and it is difficult to process the composition in an internal mixer and calender it. Also, the sheet material is quite soft, making it more susceptible to dirt pick up, and glass microspheres tend to be pushed into the sheet material by road traffic, whereupon the microspheres are embedded and reflection is reduced.

DETAILED DESCRIPTION

Non-crosslinked elastomer precursor is used in pavement-marking sheet material of the invention to provide a viscoelastic character, which permits absorption of the forces and pressures of wheeled road traffic without creating internal forces that tend to remove the marking from the roadway. Acrylonitrile-butadiene polymers are especially desirable elastomer precursors because they offer a high degree of oil resistance. Other useful non-crosslinked elastomer precursors which offer good oil resistance include neoprene and polyacrylates. Natural rubber and styrene-butadiene polymers may also be used. Extender resins, preferably halogenated polymers such as chlorinated paraffins, but also hydrocarbon resins or polystyrenes, are preferably included with the non-corsslinked elastomer precursor ingredients, and are miscible with, or form a single phase with, the elastomer precursor ingredients. The latter preferably account for at least 50 weight-percent of the polymeric ingredients in a composition of the invention.

To achieve desired mixing of the thermoplastic reinforcing polymer and the other ingredients, the reinforcing polymer should soften at a temperature between about 75° C. and 200° C. Useful thermoplastic reinforcing polymers include polyolefins, vinyl copolymers, polyethers, polyacrylates, styrene-acrylonitrile copolymers, polyesters, polyurethanes and cellulose derivatives. Polyolefins act as a plasticizer during the mixing operation, and lower the energy required to complete the mixing, which is one reason they are preferred. To achieve desired reinforcement, the polymer should generally be extrudable as a self-supporting stretchable continuous film, which is typified by low-density polyethylenes having molecular weights of 75,000–100,000 or more and linear low-density polyethylene (i.e., low density polyethylene, which has short-chain polymer branching, but having reduced long-chain polymer branching) and high-density polyethylenes having molecular weights of 20,000 or more.

Another advantage of polyolefins, especially polyethylene, is that they do not absorb or otherwise pick up dirt as fast as many other polymers, with the result that a pavement-marking composition of the invention can remain whiter and cleaner longer than prior-art pavement-marking materials.

At least 5 parts of thermoplastic reinforcing polymer, but no more than 100 parts, are generally included for each 100 parts of non-crosslinked elastomer precursor in a sheet material of the invention, and preferably between about 10 and 50 parts are included. The proportions can be varied within the stated ranges depending upon the amount of other ingredients included in the composition, especially the amount and kind of fillers included.

Fillers are generally included in the composition at least to color it but preferably also to add other properties such as reinforcement, extending, surface hardness, and abrasion resistance. Platelet fillers, i.e., fillers having a plate-like shape, such as magnesium silicate, talc, or mica, are preferred, because they have been found to give the best abrasion resistance and downweb strength properties. The platelets become oriented during the calendering procedure, which contributes especially to the abrasion resistance and downweb properties of the sheet product. Also the platelet fillers make the sheet material harder, which contributes to maintaining a white appearance on the roadway. In addition, the platelet fillers have a high ratio of surface area to volume, which enhances their reinforcing ability.

Other fillers, such as needle-type or bead-type fillers, may be included instead of or in addition to the platelet fillers, but they are less desired because of their lower surface area per unit volume.

The amount of filler included in sheet material of the invention varies with the kind of filler used. Preferably at least 10 parts of platelet fillers are used per 100 parts of non-crosslinked elastomer-precursor. With lower amounts of thermoplastic reinforcing filler, higher amounts of filler are desired, though platelet fillers in an amount more than 150 parts per 100 parts of elastomer-percursor tend to stiffen the product excessively. Best results have been achieved with amounts of platelet fillers between about 50 and 100 parts.

Transparent microspheres and skid-resisting particles are also generally included in a sheet marterial of the invention to provide reflectivity at night and to give the sheet material skid-resisting qualities. An exterior layer of such particles may be provided on the top of the sheet material, partially embedded in the sheet material and partially protruding from the sheet material, to provide immediate reflectivity and skid-resistance; and other particles may be embedded in the sheet material to become exposed as the sheet material is worn away. The particles may be held in the partially protruding position by use of a support film adhered to sheet material of the invention, for example, as taught in U.S. Pat. No. 4,117,192.

After mixing, the ingredients are processed on calendering rolls where they form a smooth band and are processed into thin sheets of the desired thickness. Generally sheets are formed having a thickness of at least about ¼ millimeter, and preferably at least about 1 millimeter, but generally the sheets are less than about 5 millimeters thick, and preferrably less than 3 millimeters thick.

As previously indicated, the calendered sheet material is found to have a significantly greater tensile strength downweb than it does crossweb, i.e., its downweb tensile strength is at least about 20–25 percent higher than its crossweb tensile strength, apparently due to orientation of the reinforcing polymer. A high downweb tensile strength is desirable for ease of processing and for ease of application, but a lower crossweb tensile strength may allow the sheet material to have better conformability to a roadway surface. Sheet material of the invention generally has a downweb tensile strength of at least 10 kilograms per square centimeter at 25° C., and preferably at least 25 kilograms per square centimeter downweb.

The sheet material also has good abrasion resistance as may be indicated by a modified Taber abrasion test. The test uses an H-22 Taber abrader wheel, with a one kilogram weight on the wheel. The test specimen is held under water, and the abrader wheel passed over the specimen for 500 cycles. Sheet material of the invention generally exhibits a loss of no more than about 5 grams in this test.

Other ingredients may also be included in sheet material of the invention, such as reinforcing fibers, pigments, and various additives.

Pavement-marking compositions of the invention are especially useful in sheets or tapes having an embossed top surface to improve reflectivity and other properties. Such an embossed sheeting is described in U.S. Pat. No. 4,388,359 and other embossed forms of pavement marking sheet material are also taught in the art.

The invention will be further illustrated by the following examples.

EXAMPLE 1

The ingredients shown in Table I were mixed in an internal mixer, such as a Banbury mixer, where they reached a temperature of approximately 150° C. The material was then cooled and calendered into a sheet about one millimeter thick.

TABLE I

| Material | Parts by Weight |
| --- | --- |
| Acrylonitrile-butadiene non-crosslinked elastomer precursor ("Hycar 1022" supplied by B. F. Goodrich) | 100 |
| Chlorinated paraffin ("Chlorowax 70-S" supplied by Diamond Shamrock) | 70 |
| Chlorinated paraffin ("Chlorowax 40") | 5 |
| Fibers of high-density polyethylene having a molecular weight ranging between 30,000 and 150,000 | 20 |
| Titanium dioxide pigment | 130 |
| Talc platelet filler particles averaging 2 micrometers in size and having a surface area of 25 square meters per gram | 100 |
| Transparent glass microspheres averaging about 100 micrometers in diameter and having an index of refraction of 1.5 | 280 |
| Spherical silica reinforcing filler ("Hisil 233" supplied by PPG Industries) | 20 |
| Stearic acid release agent | 3.5 |
| Ultramarine Blue | 0.5 |
| Chelator ("Vanstay SC" supplied by Vanderbilt) | 0.5 |

The resulting sheet material was tested for tensile strength, abrasion resistance in the test described above, and Shore A hardness. Similar measurements were made on a sheet material ("First Prior Art Sheet Material" in the table below) as described in the Example in column 4 of U.S. Pat. No. 4,069,281, using Hycar 1022 for the "regenerated nitrile rubber" and low-density polyethylene having a molecular weight of about 5000 as the "low-molecular weight" polyethylene, and on sheet material having the composition described in U.S. Pat. No. 4,117,192, table bridging columns 4 and 5 ("Second Prior Art Sheet Material"). Results are presented in Table II.

TABLE II

|  | First Prior Art Sheet Material | Second Prior Art Sheet Material | Sheet Material of the Invention |
|---|---|---|---|
| Abrasion loss | 1.8 | 3 | 0.7 |
| Tensile strength (kilograms per square centimeter) |  |  |  |
| Downweb | 5.2 | 18 | 70 |
| Crossweb | 5.3 | 12.6 | 30 |
| Shore A hardness | 66 | 88 | 88 |

EXAMPLES 2 TO 14

Following the procedures of example 1, a wide variety of pavement-marking compositions were prepared in which different classes of polymeric materials were chosen as the thermoplastic reinforcing polymer. Table III summarizes processing conditions and test properties for these pavement-marking compositions of the invention. The column headed Tmax gives the maximum temperature that the ingredients reached during mixing.

TABLE III

| Ex. No. | Thermoplastic Reinforcing Polymer[2] | Tmax (°C.) | Abrasion Loss (grams) | Tensile Strength kg/cm² Downweb | Tensile Strength kg/cm² Crossweb | Hardness (Shore A) |
|---|---|---|---|---|---|---|
| 2 | Low Density Polyethylene | 150 | 0.7 | 52.0 | 32.0 | 85 |
| 3 | Linear Low Density Polyethylene | 152 | 0.8 | 49.8 | 17.1 | 80 |
| 4 | Vinyl copolymer | 164 | 0.2 | 35.6 | 28.9 | 78 |
| 5 | Vinyl copolymer (OH functional) | 164 | 0.7 | 47.6 | 37.7 | 83 |
| 6 | Vinyl copolymer (COOH functional) | 167 | 0.6 | 38.5 | 30.4 | 80 |
| 7 | Aromatic polyether | 151 | 1.2 | 21.6 | 15.5 | 75 |
| 8 | Styrene-acrylonitrile copolymer | 161 | 1.3 | 23.9 | 16.3 | 76 |
| 9 | Acrylic copolymer | 155 | 1.5 | 17.6 | 13.6 | 75 |
| 10 | Polyester | 154 | 1.4 | 18.3 | 14.8 | 71 |
| 11 | Aromatic Polyester | 180 | 0.9 | 13.0 | 11.0 | 71 |
| 12 | Polyester-urethane | 164 | 2.0 | 13.1 | 10.8 | 72 |
| 13 | Polyether-urethane | 154 | 1.7 | 17.0 | 14.3 | 76 |
| 14 | Ethyl Cellulose | 168 | 1.6 | 13.7 | 11.5 | 73 |

[2]The commercial designations and suppliers for polymers used as the thermoplastic reinforcing polymer in the examples are:
2 LD600, Exxon
3 GRSN 7047, Union Carbide
4 VYHH, Union Carbide
5 VAGH, Union Carbide
6 VMCH, Union Carbide
7 Phenoxy PKHH, Union Carbide
8 Lustran 31-7042, Monsanto
9 Plexiglas V, Rohm & Haas
10 Vitel VPE-307, Goodyear
11 Kodar PETG 6763, Eastman
12 Q-than PS 629, K. J. Quinn
13 Q-thane PE 192, K. J. Quinn
14 Ethocel MS Natural, American Polymers

EXAMPLE 15

Following the procedures of Example 1, the ingredients shown in Table IV were processed to form a pavement-marking composition of the invention. In this example, the non-crosslinked elastomer precursor comprises a mixture of a styrene-butadiene copolymer and natural rubber. The sheet material was tested for tensile strength, abrasion resistance as described above, and Shore A hardness. Test results are found in Table V.

TABLE IV

| Material | Parts by Weight |
|---|---|
| Styrene-butadiene non-crosslinked elastomer precursor (SBR 1502, supplied by General Tire) | 75 |
| Natural rubber (Standard Malaysian Rubber SMR #5) | 25 |
| Chlorinated paraffin (Chlorowax 70) | 70 |
| Chlorinated paraffin (Chlorowax 40) | 10 |
| Fibers of high-density polyethylene | 20 |
| Titanium dioxide pigment | 130 |
| Talc filler | 75 |
| Glass microspheres | 280 |
| Spherical silica | 30 |
| Stearic acid | 3.5 |
| Ultramarine Blue | 0.5 |

TABLE V

| | |
|---|---|
| Abrasion loss, grams | 1.9 |
| Tensile strength (Kg/m²) | |
| Downweb | 14.3 |
| Crossweb | 5.4 |
| Shore A hardness | 74 |

What is claimed is:

1. Pavement-marking composition in sheet form comprising 100 parts of non-crosslinked elastomer precursor, at least 5 parts of a thermoplastic reinforcing polymer which is dispersed in the elastomer as a separate phase and softens at a temperature between about 75° and 200° C., and a particulate inorganic filler dispersed in the composition; said composition being processable on calendering rolls to a thickness between about ¼ and 5 millimeters, and in sheet form having a greater tensile strength downweb than it has in the crossweb direction.

2. Pavement-marking composition of claim 1 in which said thermoplastic reinforcing polymer comprises polyolefin.

3. Pavement-marking composition of claim 1 which has a tensile strength of at least 10 kilograms per square centimeter.

4. Pavement-marking composition of claim 1 in which the non-crosslinked elastomer precursor comprises acrylonitrile-butadiene polymer.

5. Pavement-marking composition of claim 1 in which said thermoplastic reinforcing polymer comprises polyethylene.

6. Pavement-marking composition of claim 5 in which the polyethylene is selected from linear low-density polyethylenes and high-density polyethylene having a molecular weight of at least about 20,000 and low-density polyethylene having a molecular weight of at least about 75,000.

7. Pavement-marking composition of claim 1 which further includes a thermoplastic extender resin that is miscible in, and forms a single phase with, the non-crosslinked elastomer precursor.

8. Pavement-marking composition of claim 7 in which said thermoplastic extender resin comprises a halogenated paraffin.

9. Pavement-marking composition of claims 1, 2, 5, 6, 3, 7, 4, or 8 in which the filler comprises platelet fillers.

10. Pavement-marking composition in sheet form comprising 100 parts of non-crosslinked elastomer precursor; at least 5 parts of a polyethylene reinforcing polymer which is dispersed in the elastomer as a separate phase and is selected from linear low-density polyethylene and high-density polyethylene having a molecular weight of at least about 20,000 and a low-density polyethylene having a molecular weight of at least about 75,000; and a particulate inorganic filler dispersed in the composition; said composition being processable on calendering rolls to a thickness between about ¼ and 5 millimeters, and in sheet form having a tensile strength of at least 10 kilograms per square centimeter and an abrasion loss in the test described herein of no more than about 5 grams; the tensile strength downweb being significantly greater than the tensile strength crossweb.

11. Pavement-marking composition of claims 1 or 10 having an embossed top surface.

12. Pavement-marking composition of claim 10 in which the non-crosslinked elastomer precursor comprises acrylonitrile-butadiene polymer.

13. Pavement-marking composition of claim 10 which further includes a thermoplastic extender resin that is miscible in, and forms a single phase with, the non-crosslinked elastomer precursor.

14. Pavement-marking composition of claim 13 in which said extender resin comprises a halogenated paraffin.

15. Pavement-marking composition of claim 14 in which the non-crosslinked elastomer precursor comprises acrylonitrile-butadiene polymer.

16. Pavement-marking composition of claims 10, 13, 14, 12 or 15 in which the filler comprises platelet fillers.

17. Pavement-marking composition of claims 10, 13, 14, 12 or 15 in which the filler is selected from magnesium silicate, talc or mica filler particles.

* * * * *